Figure 1:
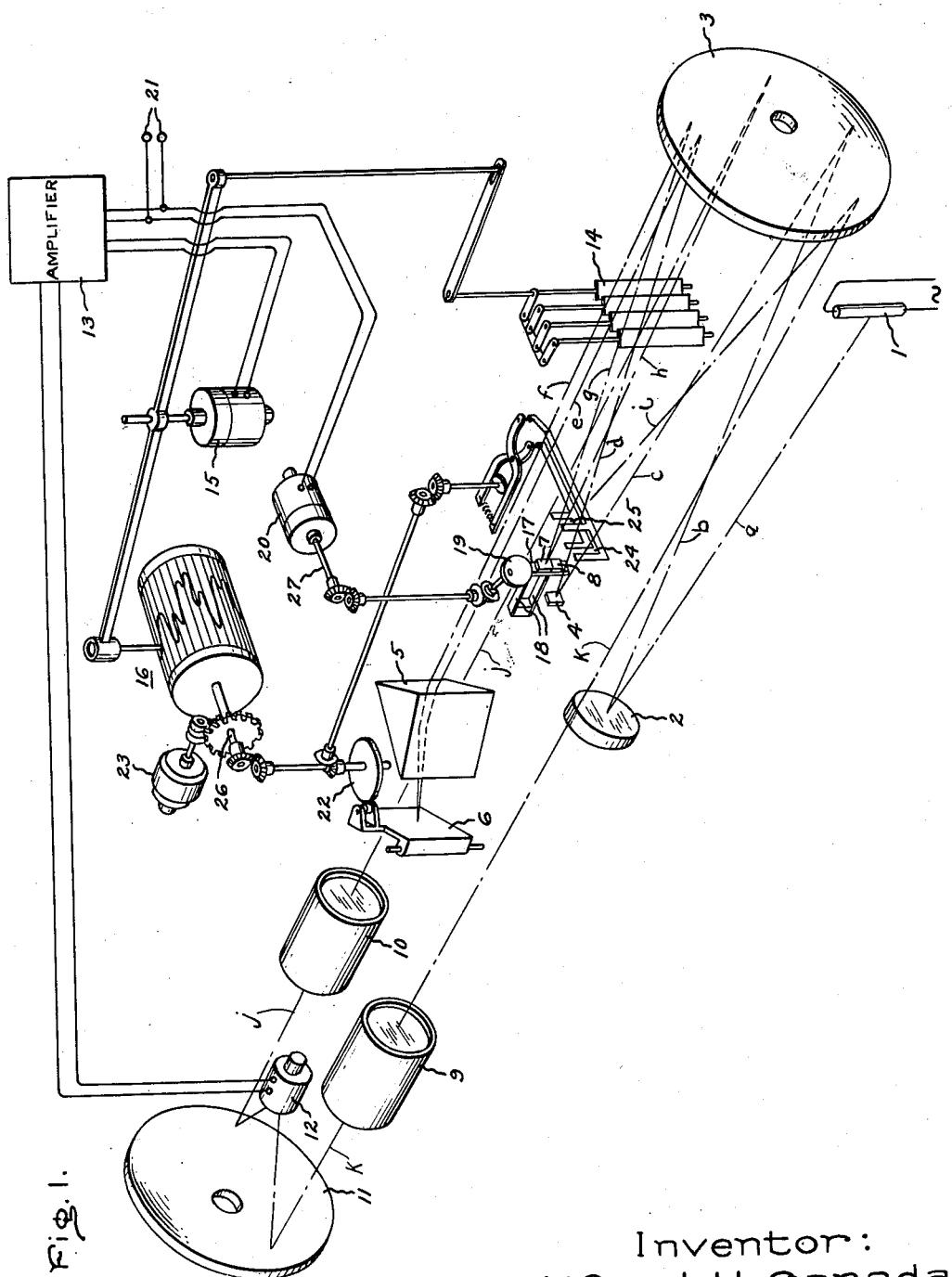

Aug. 5, 1952     A. H. CANADA     2,605,671
SPECTROPHOTOMETER

Filed Feb. 28, 1948     3 Sheets-Sheet 1

Inventor:
Alfred H. Canada,
by *Dravell P. Mack*
His Attorney.

Aug. 5, 1952 — A. H. CANADA — 2,605,671
SPECTROPHOTOMETER
Filed Feb. 28, 1948 — 3 Sheets-Sheet 2

Inventor:
Alfred H. Canada,
by Prowell F. Mack
His Attorney.

Aug. 5, 1952     A. H. CANADA     2,605,671
SPECTROPHOTOMETER
Filed Feb. 28, 1948     3 Sheets-Sheet 3

Inventor:
Alfred H. Canada,
by *Crowell S. Mack*
His Attorney.

Patented Aug. 5, 1952

2,605,671

UNITED STATES PATENT OFFICE 2,605,671

SPECTROPHOTOMETER

Alfred H. Canada, Schenectady, N. Y., assignor to General Electric Company, a corporation of New York Application February 28, 1948, Serial No. 11,961

5 Claims. (Cl. 88—14)

My invention relates to photometers, and particularly to an improved spectrophotometer of the double-beam type adapted to compare characteristics of two substances, one of which may be air or a vacuum, by measuring the relative amounts of monochromatic light transmitted by the two substances at one or more wavelengths.

In spectrophotometers of the type described, two parallel optical paths are provided and one of the substances to be compared is introduced into each path. In previous photometers, inaccuracies have been caused by stray radiation due to differences in temperature of optical parts in the two paths. This stray radiation is very troublesome when measurements are made in the infra-red region of the spectrum, since objects at room temperature radiate considerable infra-red energy, and even slight temperature differences of various optical parts will cause appreciable differences in the amounts of energy radiated by such parts. An object of my invention is to minimize these inaccuracies, which I accomplish by providing an improved optical system having two paths which utilize common optical elements substantially throughout the system.

A somewhat similar difficulty is encountered from stray radiation emitted by the substances to be compared, as it is often impractical to maintain the two substances at identical temperatures. Thus they may radiate substantially different amounts of energy, which will cause a false indication. It is another object of my invention to overcome this difficulty, which I accomplish by passing modulated light beams through the substances to be compared and using a detector which is responsive only to the modulated light. Stray radiation emitted by the compared substances is unmodulated and, hence, does not affect the indication.

Other stray radiation may come from supporting parts and from the air or other gas within the instrument case. A further object of my invention is to provide a photometer in which the effects of this stray radiation are minimized, which I accomplish by modulating a light beam containing only the desired frequency and by enclosing the entire optical system within a case which may be evacuated.

Another difficulty encountered in such photometers is that displacement of the optical parts, due to temperature changes of the supporting members, produces misalignment of such optical parts, which often introduces errors in the wavelength calibration. In spectrophotometry, even very small wavelength inaccuracies are extremely objectionable since the light absorption bands characteristic of different substances occupy fixed but relatively very narrow positions in the spectrum. It is an object of my invention to provide an improved optical system for a photometer in which temperature changes of the supporting parts will have substantially no effect upon the wavelength calibration of the instrument.

Another object of my invention is to provide a photometer of the type described in which the light transmitted through the substances to be compared is sinusoidally modulated to provide improved results using a null balance detector.

In photometers of the type described the light beams passed through the substances tested are commonly composed of non-parallel rays. Much better quantitative interpretation of the results can be obtained if only parallel rays are passed through the materials tested. It is an object of my invention to provide an improved optical system for a photometer in which the light rays passing through the substances tested are substantially parallel.

It is a further object of my invention to provide an improved optical system for a photometer which can be easily aligned and adjusted.

It is a still further object of my invention to provide a photometer of the type described having relatively simple construction and easily interchangeable parts.

Figure 2:
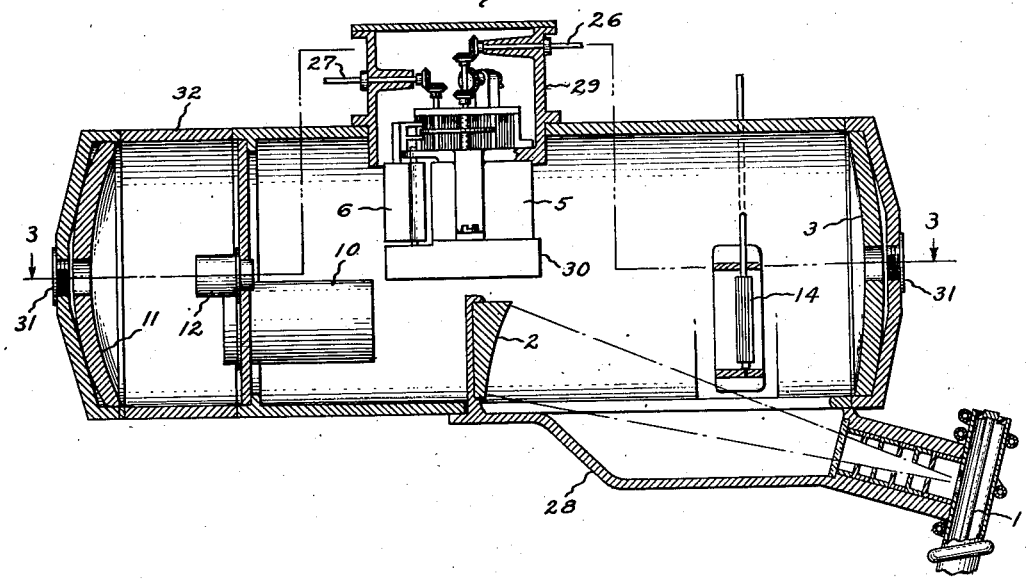
Figure 3:
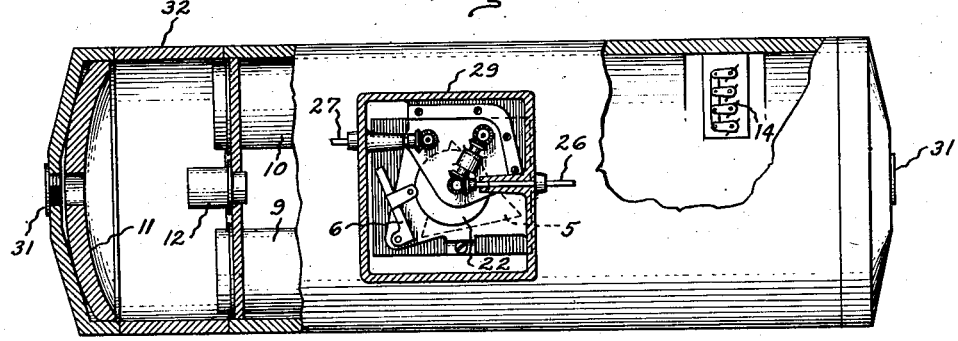
Figure 4:
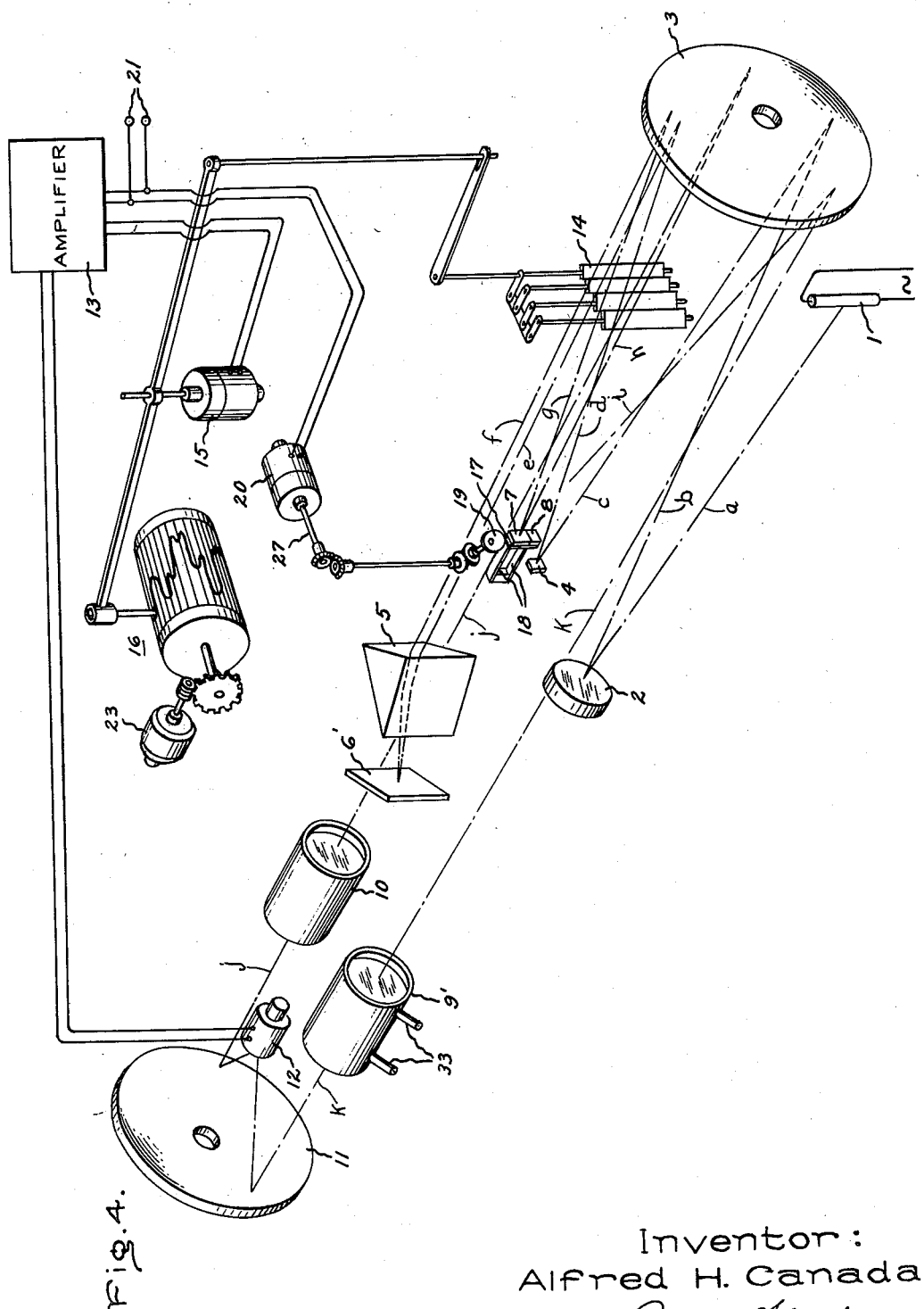

The features of my invention which I believe to be novel and patentable are pointed out in the claims appended hereto. For a better understanding of my invention, reference is made in the following description to the accompanying drawings in which Fig. 1 is a schematic diagram of one form of my invention; Fig. 2 is a vertical section showing the assembly of apparatus shown in Fig. 1; Fig. 3 is a plan view partly in section of the apparatus shown in Fig. 2; and Fig. 4 is a schematic diagram of another form of my invention. Like reference characters represent like parts throughout the drawings. Optical paths are indicated by light broken lines which represent the general directions of the optical paths but do not represent all of the individual light rays.

Referring now to Fig. 1, I have shown in a schematic diagram a spectrophotometer embodying the principles of my invention. A light source 1 may be adapted to emit visible light, infra-red light or ultra-violet light, as desired. Light travels from source 1 in the direction indicated by broken line $a$ to a collimating mirror 2 which is positioned to collect rays of light from source 1 and to reflect them to a portion of principal mirror 3 as a beam of substantially parallel rays traveling substantially along the path indicated by broken line $b$. Mirror 3, which is parabolic in shape, reflects the rays along a path represented by broken line $c$ to a focal point, substantially at the principal focus of mirror 3, at which is located a small plane mirror 4. Mirror 4 reflects the focused rays back along the path represented by broken line $d$ to another portion of mirror 3 from which they are again reflected as a beam of parallel rays traveling in the direction of broken line $e$ to prism 5. The rays are refracted by prism 5, and rays of different wavelengths are dispersed. A plane mirror 6 is positioned to reflect rays of the desired wavelength back through the prism along the path represented by broken line $f$ to mirror 3. By properly positioning mirror 6, any desired wavelength can be selected, as the rays of different frequencies follow slightly different paths due to the dispersion produced by prism 5. Thus, this part of the apparatus is essentially a monochromator.

Upon arriving back at mirror 3, rays of the desired wavelength are again reflected along the path represented by broken line $g$ to a second focal point, which is also located substantially at the principal focus of mirror 3. However, this focal point is a small distance away from the focal point at which mirror 4 is located, since the rays which are focused at the respective focal points arrive at mirror 3 from slightly different directions. A flicker mechanism comprises two mutually adjacent plane mirrors 7 and 8 which are moved alternately into the path of the rays focused at the second focal point, as hereinafter explained, and are respectively positioned at different angles to the direction of incidence of the beam of focused light, to reflect the focused rays along two parallel paths represented by broken lines $h$ and $i$ to two different portions of mirror 3. Mirror 3 again reflects these rays as two beams of parallel monochromatic rays along two parallel paths respectively represented by broken lines $j$ and $k$ to a second parabolic mirror 11. Cells 9 and 10, which are adapted to contain the substances to be tested, one of which may serve as a standard, are respectively positioned in the paths $j$ and $k$ of these two beams, so that light in each beam is absorbed by the substance within the respective cell through which it passes.

Upon arriving at mirror 11, the light in both beams is re-focused to a common focal point at which is located a light-responsive detector 12. Light reaches detector 12 from each beam alternately, as mirrors 7 and 8 alternately move into the path of the focused rays. If equal amounts of light arrive via each of the two paths, the energy received at the detector is constant in value; but if more energy arrives via one path than via the other, there will be an alternating component in the energy received at the detector, the phase of which will depend upon which path transmits the greater amount of light. Detector 12, which may be a bolometer, thermopile, or other sensitive radiation detector, provides an output electric signal which is amplified by phase-sensitive amplifier 13. It should be noted that light traversing both of the two optical paths undergoes multiple reflections from a single principal mirror 3. Any temperature changes of this mirror affect both paths equally, and thus do not produce false indications at the detector.

A light attenuator 14 is located in the path $j$ of one of the light beams between mirrors 3 and 11. The amount of attenuation produced by attenuator 14 is adjustable by an electric motor 15 which, in turn, acts responsive to the output of amplifier 13, so that any inequality in the amounts of light reaching the detector via the two paths is corrected by an adjustment of attenuator 14. In other words, if the amount of light in the beam along path $j$ which reaches detector 12 exceeds the amount of light in the beam along path $k$ which reaches the detector, the apparatus acts to close the shutters of attenuator 14 sufficiently to produce equality of light in the two beams which reaches the detector. Conversely, if a lesser amount of light in the beam along path $j$ reaches the detector than the amount of light in the beam along path $k$ which reaches the detector, the shutters of attenuator 14 are opened sufficiently to produce equality of the two. Thus a null balance system is provided. A fixed attenuator, not shown, may be inserted in the other path $k$ if required to obtain a balance over the required range. Generally, the fixed attenuator is not required if the one of the one of the two substances compared which transmits the smaller proportion of light is placed in cell 9. It will be appreciated that it would also be possible to place variable attenuators in both paths, connected together so that one would be opened as the other closed, without changing the principles involved. Motor 15 also drives recorder mechanism 16 to provide a record of the attenuation required for balance. It is evident that the light rays passing between mirrors 7 and 8 and detector 12 are modulated by the preferably sinusoidal motion of mirrors 7 and 8. It is desirable that this modulation be sinusoidal to obtain the best null balance for optimum operation of detector 12. Since only the alternating component of energy is detected, unmodulated stray radiation originating in the substances tested, or elsewhere in the instrument, has substantially no effect upon the indication.

Mirrors 7 and 8 are mounted upon a movable element 17 which, in turn, is supported by two leaf springs 18. Element 17 is vibrated sinusoidally up and down by a cam 19 driven by a synchronous motor 20. Thus mirrors 7 and 8 are alternately moved into the beam of focused light, while the incident angles between such light and the respective mirrors is kept constant. As element 17 is vibrated, the relative amounts of light incident on the two mirrors 7 and 8 vary sinusoidally in phase opposition, and consequently the intensities of the two beams along respective paths $j$ and $k$ vary similarly. Motor 20 is energized from a source of alternating electric power supplied through terminals 21. The same electric power source is used to energize phase-sensitive amplifier 13 to maintain synchronism between the phase-sensitive amplifier and the modulation of the light beams.

A cam 22, driven by motor 23, continuously changes the position of mirror 6, so that the wavelength of light passing through the substances tested is swept over the desired range during each test run. Motor 23 also rotates the drum of recorder mechanism 16 so that the recorder plots a record of relative light absorption versus wavelength.

Two slits 24 and 25 are provided in front of mirror 4 and mirrors 7 and 8, respectively. These slits, which are the entrance and exit slits respectively of the monochromator, pass rays of the desired wavelength, and obstruct rays of other wavelengths, so that a more nearly monochromatic beam is obtained. Since the amount of light energy available at various wavelengths is not the same, mechanism as shown, geared to cam 22, is provided to vary the width of slits 24 and 25 responsive to changes in wavelength. In this way, the amount of energy reaching the detector can be maintained substantially constant, and maximum sensitivity and selectivity are available at all wavelengths.

In Figs. 2 and 3 I have been shown detailed construction and assembly of the spectrophotometer illustrated schematically in Fig. 1. Each part corresponds to a like numbered part in the other figures. Shaft 26 connects to recording mechanism 16 and motor 23, which are not shown in Figs. 2 and 3, and shaft 27 connects to motor 20 which also is not shown. Light source 1 may be a water-cooled, infra-red source of the type illustrated, or any convenient source of radiations of the desired wavelength. The parts are so arranged and constructed that the entire light source assembly 28 may be easily removed and a new assembly substituted therefor, in like manner, the monochromator parts are all grouped in a conveniently removable assembly 29. Mirrors 4, 7, and 8 and slits 24 and 25 are located in the lower portion 30 of this assembly.

The entire optical system is contained within a simple but rigid tubular case, as shown, which may be evacuated when required to eliminate absorption or emission of radiation by air within the case. Two removable plugs 31 are located in the ends of the case behind small holes in the center of parabolic mirrors 3 and 11. These plugs may be removed to permit visual observation of images and thus simplify optical alignment of the system, and replaced to exclude radiation originating outside the instrument and to permit evacuation of the case. A rear portion 32 of the case is removable to permit easy access to cells 9 and 10. It should be noted that with this arrangement the chief effect upon the optical system of thermal expansion and contraction of the case is a small relative movement of the optical parts in the direction of the axis of the case. This causes a slight defocussing which produces slight variations in the amount of energy reaching detector 12, but the effect is the same upon light traversing each of the two optical paths, so that the effect upon the final indication is negligible. There is substantially no tendency for the optical parts to undergo relative movement perpendicular to the axis of the case, and thus there is substantially no error in the wavelength calibration.

Referring now to Fig. 4, I have shown schematically a monophotometer embodying the principles of my invention. Such an instrument is useful, for example, in industrial process control where sufficient information can be obtained by comparing samples from the process with a standard at a single wavelength. This instrument is similar to the spectrophotometer previously described, except that certain parts may be omitted since there is no necessity to continuously change the wavelength during each test run. Thus the position of mirror 6' may be adjusted before the run is begun and thereafter remain stationary. Cam 22 and its associated driving mechanism may thus be omitted. It is also evident that there is no need to provide variable width slits 24 and 25. Slits having a fixed width may be substituted, or the slits may be omitted altogether if mirrors 4, 7, and 8 are sufficiently narrow to reflect only the desired wavelengths. Process control sample cell 9' can be provided with inlet and outlet pipes 33 so that a fluid from the process can be continuously circulated through the sample cell. The standard for comparison may be permanently sealed in cell 10. This arrangement of the cells may also be employed in the spectrophotometer shown in Fig. 1. If the standard to be employed is air, or vacuum when the photometer case is evacuated, cell 10 may be omitted. In other respects, the monophotometer is identical to the spectrophotometer previously described.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to be secured by Letters Patent of the United States is:

1. A photometer comprising a principal parabolic mirror, a second parabolic mirror facing and axially aligned with the face of the principal mirror, a source of substantially parallel rays of monochromatic light directed to a portion of the principal mirror from which the rays are reflected to a focal point located substantially at the principal focus of said principal mirror, flicker mechanism located at such focal point to redirect the focused rays to two portions of said principal mirror alternately so that the rays are reflected as substantially parallel rays traveling alternately along two paths from the principal mirror to the second parabolic mirror, means to introduce substances to be compared into each of said two paths, an adjustable light attenuator positioned in one of said two paths, a detector responsive to variations in the amount of light arriving at the focus of the second parabolic mirror, and mechanism for adjusting said attenuator responsive to the action of said detector to equalize the amounts of light arriving at the detector along each of the two paths.

2. In a photometer, the combination of a principal parabolic mirror, a second parabolic mirror facing and axially aligned with the face of the principal mirror, a light source, collimating means to direct light from said source to said principal mirror in parallel rays so that said rays are directed toward a first focal point by the principal mirror, a first plane mirror located substantially at said first focal point and positioned to redirect the focused rays to the principal mirror from which they are again reflected as parallel rays, a prism positioned to intercept and refract such re-reflected parallel rays and to disperse rays of different wavelengths, a second plane mirror positioned to reflect said refracted rays back through the prism to the principal mirror so that rays of a desired wavelength are directed toward a second focal point, means to redirect such monochromatic rays to two portions of the principal mirror alternately so that they are reflected as substantially parallel rays along two paths from the principal mirror to the second parabolic mirror, means to introduce substances to be compared into said paths, an adjustable light attenuator positioned in one of said paths, a detector responsive to variations in the amount of light arriving at the focus of the second parabolic mirror, and mechanism for adjusting said attenuator responsive to the action of said detector to equalize the amounts of light arriving at the detector along each of the two paths.

3. A photometer comprising a principal parabolic mirror, a source of substantially parallel rays of monochromatic light directed to a portion of said principal mirror from which the rays are reflected and redirected to a focal point substantially at the principal focus of the principal mirror, two mutually adjacent plane mirrors positioned at different angles to the direction of incidence of the light focused at said focal point, means to move said plane mirrors alternately into the light focused at said focal point while maintaining constant angles of incidence between the focused light and the two plane mirrors respectively, so that the focused rays are redirected to two portions of the principal mirror alternately and are again reflected from said principal mirror along two paths, means to introduce substances to be compared into said paths, and means to compare the light transmitted by the substances in each of the two paths.

4. In a photometer, a monochromator comprising a light source, a principal parabolic mirror, collimating means to direct light from said source to said principal mirror in parallel rays so that said rays are directed toward a first focal point by the principal mirror, a first plane mirror located substantially at said first focal point and positioned to redirect the focused rays to the principal mirror from which they are again reflected as parallel rays, a prism positioned to intercept and refract such re-reflected parallel rays and to disperse rays of different wavelengths, a second plane mirror positioned to reflect said refracted rays back through the prism to the principal mirror so that rays of a desired wavelength are focused at a second focal point, a third plane mirror positioned at said second focal point to redirect the focused rays back to the principal mirror where they are again reflected as a beam of substantially parallel monochromatic rays, a first slit located in the path of rays entering and leaving said first plane mirror, a second slit located in the path of rays entering and leaving said third plane mirror, means to vary the position of the second plane mirror to shift the directions of the dispersed rays and thus vary the wavelength of the monochromatic beam, and means to vary the width of at least one of the slits responsive to such wavelength changes to maintain the transmitted energy substantially constant in value.

5. In a photometer, the combination of a principal parabolic mirror, a second parabolic mirror facing and axially aligned with the face of the principal mirror, a light source, collimating means to direct light from said source to said principal mirror in substantially parallel rays so that said rays are directed toward a first focal point by the principal mirror, a first plane mirror located substantially at said first focal point and positioned to redirect the focused rays to the principal mirror from which they are again reflected as parallel rays, a prism positioned to intercept and refract such re-reflected parallel rays and to disperse rays of different wavelengths, a second plane mirror positioned to reflect said refracted rays back through the prism to the principal mirror so that rays of a desired wavelength are focused at a second focal point, mutually adjacent third and fourth plane mirrors, means to position said third and fourth plane mirrors alternately at said second focal point so that the focused rays are redirected to two portions of the principal mirror alternately and are again reflected as substantially parallel monochromatic rays along two paths from the principal mirror to the second parabolic mirror, a first slit located in the path of rays entering and leaving said first plane mirror, a second slit located in the path of rays entering and leaving the third and fourth plane mirrors, means to vary the position of the second plane mirror to vary the wavelength of the monochromatic beams, means to vary the width of at least one of the slits responsive to such wavelength changes, means to introduce substances to be compared into each of said two paths, a light attenuator positioned in one of said two paths, a detector responsive to variations in the amount of light arriving at the focus of the second parabolic mirror, and mechanism for adjusting said attenuator responsive to the action of said detector to equalize the amounts of light arriving at the detector along each of the two paths.

ALFRED H. CANADA.

REFERENCES CITED

The following references are of record in the file of this patent:

UNITED STATES PATENTS

| Number | Name | Date |
|---|---|---|
| 527,640 | Weatherill | Oct. 16, 1894 |
| 1,746,525 | Darrah | Feb. 11, 1930 |
| 1,964,365 | Razek et al. | June 26, 1934 |
| 2,157,389 | Park | May 9, 1939 |
| 2,314,800 | Pineo | Mar. 23, 1943 |
| 2,406,318 | Brace | Aug. 27, 1946 |
| 2,437,323 | Heigl et al. | Mar. 9, 1948 |
| 2,439,373 | Stearns | Apr. 6, 1948 |
| 2,444,560 | Feldt et al. | July 6, 1948 |
| 2,458,973 | Barnes | Jan. 11, 1949 |
| 2,462,946 | Coggeshall et al. | Mar. 1, 1949 |

FOREIGN PATENTS

| Number | Country | Date |
|---|---|---|
| 584,506 | Great Britain | Jan. 16, 1947 |